United States Patent
Thomas et al.

(10) Patent No.: US 10,360,172 B1
(45) Date of Patent: Jul. 23, 2019

(54) DECOUPLED PERIPHERAL DEVICES

(71) Applicant: Amazon Technologies, Inc., Seattle, WA (US)

(72) Inventors: Nathan Bartholomew Thomas, Seattle, WA (US); Prasanna Subash, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 15/422,126

(22) Filed: Feb. 1, 2017

(51) Int. Cl.
*G06F 13/42* (2006.01)
*G06F 9/455* (2018.01)
*G06F 13/40* (2006.01)

(52) U.S. Cl.
CPC ...... *G06F 13/4282* (2013.01); *G06F 9/45558* (2013.01); *G06F 13/4068* (2013.01); *G06F 2009/4557* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 2007/0244966 A1* | 10/2007 | Stoyanov | H04L 45/00 709/204 |
| 2010/0180050 A1* | 7/2010 | Hsiao | G06F 13/102 710/5 |
| 2013/0166629 A1* | 6/2013 | Ivashin | H04L 63/10 709/203 |
| 2014/0223043 A1* | 8/2014 | Dersy | H04W 76/00 710/62 |
| 2017/0026473 A1* | 1/2017 | Dersy | H04L 67/141 |

* cited by examiner

*Primary Examiner* — Elias Mamo
(74) *Attorney, Agent, or Firm* — Knobbe, Martens, Olson & Bear, LLP

(57) ABSTRACT

Systems and methods corresponding to a peripheral interface service that facilitates independent connection of peripheral devices to virtual desktop instances. The peripheral devices may utilize a network connection facilitated through a local computing device or have direct network communication capabilities. The peripheral interface service can facilitate configuration of peripheral devices. The peripheral interface service can then store the configuration information for processing subsequent connection requests from one or peripheral devices. Additionally, the peripheral interface service can facilitate connection requests for configured peripheral devices. Based on processing the request and identification of a virtual desktop instance, the peripheral interface service can then facilitate the connection request to the identified virtual desktop instance.

22 Claims, 11 Drawing Sheets

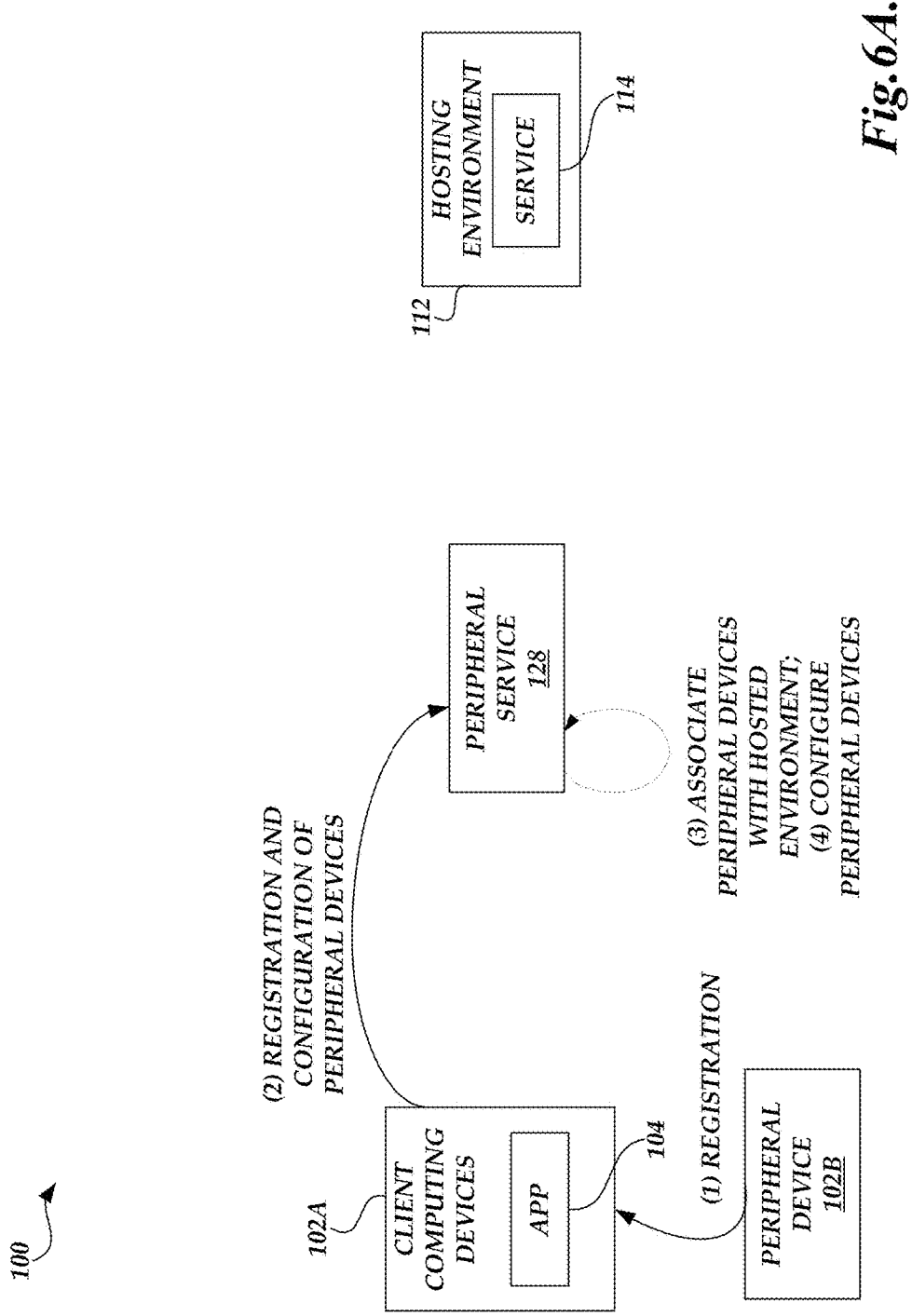

DECOUPLED PERIPHERAL DEVICES

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some embodiments, individual customers may interact with hosted virtual machine instances via an individual network computing device having various input and output peripheral devices.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 6A-6B are block diagrams of the logical network of FIG. 1 illustrating the configuration of peripheral devices and transmission of peripheral communications to a virtual machine instance utilizing a determined latency in accordance with the present application;

DETAILED DESCRIPTION

Figure 1:
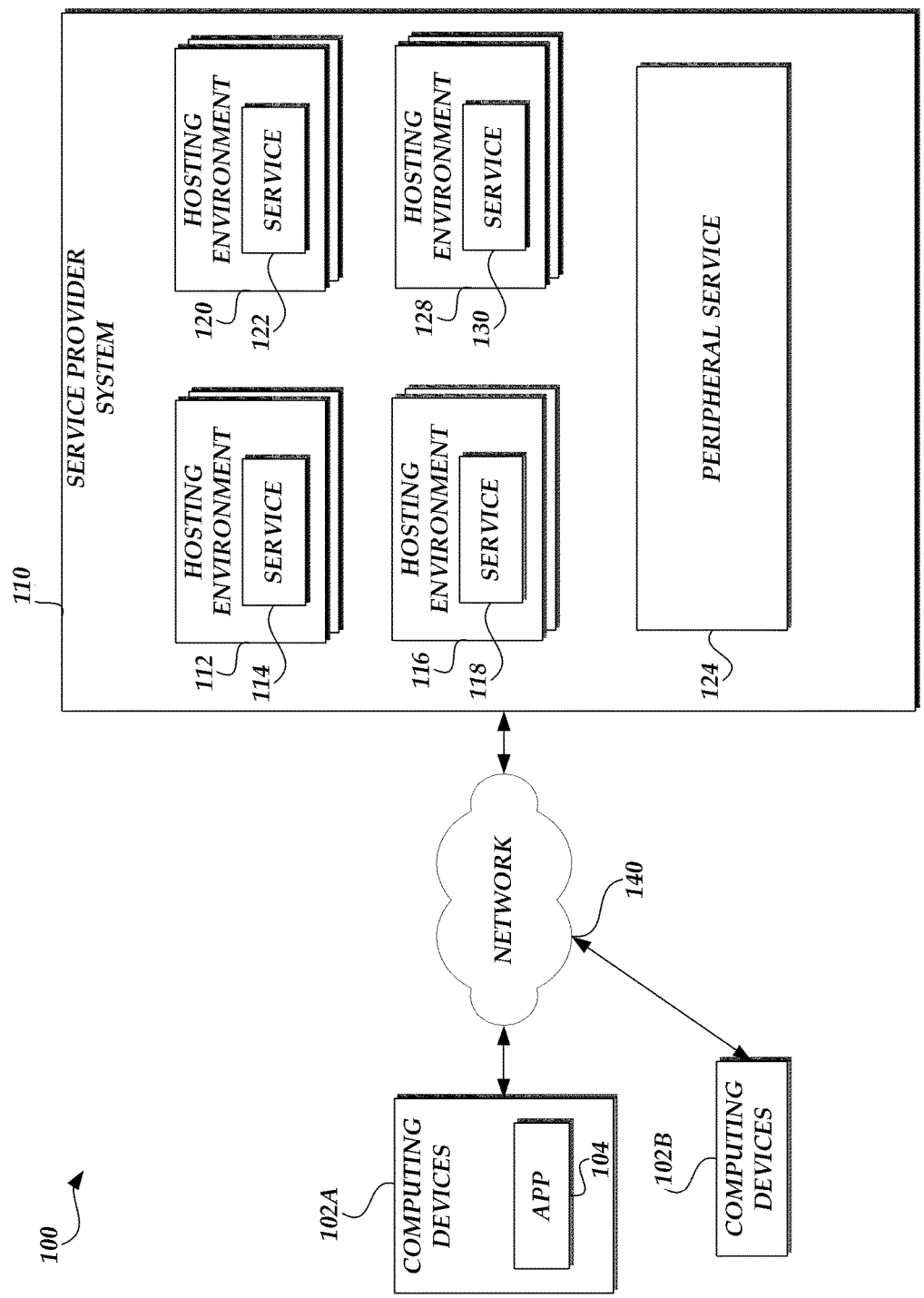
FIG. 1 is a block diagram depicting an illustrative logical network including multiple computing devices and a service provider network.

Generally described, the present application corresponds to management of peripheral devices, network services, and network communications. More specifically, aspects of the present application relate to the configuration of peripheral devices to facilitate the transmission, directly or indirectly, of peripheral communications. Illustratively, peripheral devices can include a variety of devices for generating peripheral communication signals, (e.g., input devices) that can be utilized by a computing device. The peripheral devices can also include a variety of device for receiving peripheral communication signals (e.g., output devices) that can be generated by a computing device. As applied to an illustrative embodiment of the present application, the peripheral devices can be configured to exchange peripheral communications with a hosted virtual machine instances over a communication network. As applied to another illustrative embodiment of the present application, the peripheral devices can be configured to exchange communications between two physical computing devices over a communication network.

In accordance with an illustrative embodiment, service providers can provide hosted computing environment corresponding to a virtualized computing environment that can be accessed by customers via a communication network. The virtualized computing environment can resemble, in whole or in part, a customer's physical computing environment, such as having an operating environment, software applications, data storage, and the like. Such a virtualized computing environment may be generally referred to as a virtual desktop.

Generally described, customers access virtual desktop environments via a local computing device via a communication network. For example, a customer can utilize a browser software application on the local computing device to access one or more virtual desktops hosted on a service provider network. In one aspect, customers can provide inputs to the virtual desktop by input peripherals connected to the local computing device and transmitted through the software application utilized to access the virtual desktop. Likewise, customers can receive outputs generated by the virtual desktop instances via the output peripheral connected to the same local computing device. While customers can access virtual desktop instances utilizing different local computing devices, the transmission and receipt of peripheral communications traditionally remain confined to the single, local computing device currently accessing the virtual desktop instance.

As applied to the present application, peripheral communications can correspond to data signals generated or received by hardware devices as part of interaction with computing devices. Peripheral communications can be generally interpreted by the computing device operating systems and computer systems as being directly accessible/addressable by the computing device operating systems and computer system via the data signal protocols. The data signals can be formatted in accordance with one of a variety of data signal protocols or standards, including but not limited to the Peripheral Component Interconnect ("PCI"), PCI Express, Universal Serial Bus ("USB"), Personal Computer Memory Card International Association ("PCMCIA"), Accelerated Graphics Port ("AGP") data communication standards/protocols and the like. However, the present application is not limited to any particular type of peripheral communication data standard or protocol or combinations thereof.

Generally described, service providers can provide access to peripheral devices, such as storage devices, via a communication network. In traditional implementations, however, the service providers require the utilization of a proprietary applications or software modules that encode data communications and transmit the information to the peripheral devices. Generally, however, the traditional implementation of network-based peripheral devices do not facilitate the direct receipt of peripheral communications such that network-based peripheral devices are directly addressable or recognizable by the operating system or other hardware components, including other network-based peripheral devices. For example, traditional network-based storage solutions do not allow the operating system of a local machine to specify and interact with the stored data in accordance with the native file system format specified by the operating system.

As also applied to the present application, peripheral devices can correspond to any one of a variety of input devices and output devices. Example of input devices include, but are not limited to, keyboards, mouse, microphones/headsets, memory devices (e.g., USB-enable memory devices), touch screens, pens, video cameras, still cameras, and the like. Examples of output devices include, but are not limited to, monitors or other display devices, projectors, memory devices, speakers, tactile feedback, and the like. Accordingly, reference to peripheral devices, input devices, or output devices generally should not be construed as being limited to any particular type of peripheral device or the examples provided herein. Additionally, in some embodiments, reference to peripheral devices can include multiple devices of the same type (e.g., a plurality of keyboards, memory devices, etc.).

In accordance with aspects of the present application, a service provider can maintain a network-based peripheral interface service or peripheral service for configuring peripheral communication exchange between one or more peripheral devices and hosted virtual machine instances, namely, virtual desktop instances. Communications between the peripheral devices are not limited to single, local computing devices. Rather, the peripheral interface service can configure and facilitate individualized interaction between peripheral devices and hosted virtual machine instances. In some embodiments, the peripheral devices may be connected to a computing device and utilize a network interface provided by the local computing device to transmit peripheral communications (e.g., send or receive peripheral communications). In other embodiments, the peripheral device may be configured with network interfaces to communication directly with the peripheral interface service and the virtual desktop instances. However, because the peripheral interface service configures peripheral devices independently, the specific hardware configuration of the network interface utilized by individual peripheral devices (e.g., through a computing device or directly from the peripheral device) is not limited to any particular type. Additionally, the peripheral interface service can facilitate interaction with individual virtual desktop instances with multiple peripheral devices having different hardware configurations of the network interface.

In one aspect, the peripheral interface service can facilitate configuration of peripheral devices. In this aspect, a computing device can include software applications that can transmit configuration requests to the peripheral interface service to identify peripheral devices and provide permissions, security information, customer identifications, and the like. In other embodiments, peripheral devices may also include sufficient computing resources to transmit the configuration request directly to the peripheral interface service. The peripheral interface service can then utilize the configuration request to identify one or more virtual desktop instances that can receive connection requests from the peripheral devices. The peripheral interface service can identify additional permission, security or authentication information that may be required as part of connecting the peripheral device with an individual virtual desktop instance. The peripheral interface service can then store the configuration information for processing subsequent connection requests from one or peripheral devices.

In another aspect, the peripheral interface service can facilitate connection requests for configured peripheral devices. In this aspect, the peripheral devices can either transmit a connection request through a computing device or a local network interface. The connection request can include information identifying the peripheral device and optionally additional information, such as client identifiers, security information, permission information, and the like. The peripheral interface service processes the connection request to identify one or more hosted virtual instances, such as virtual desktops, that can be associated to exchange peripheral communications with the peripheral device, which can include input or output communications. If multiple virtual desktops may be applicable, the peripheral interface service can facilitate the selection of individual virtual desktop automatically or via requested input. Based on processing the request and identification of a virtual desktop instance, the peripheral interface service can then facilitate the connection request to the identified virtual desktop instance.

In accordance with other aspects of the present application, a service provider can maintain a network-based peripheral interface service or peripheral service for configuring peripheral communication exchange between one or more peripheral devices and physical computing devices. In this embodiment, the peripheral interface service can configure and facilitate individualized interaction between peripheral devices and physical computing devices such that the physical computing devices receive peripheral communications and can directly access the peripheral devices. In some embodiments, the peripheral devices may be connected to a computing device and utilize a network interface provided by the local computing device to transmit peripheral communications (e.g., send or receive peripheral communications). In other embodiments, the peripheral device may be configured with network interfaces to communication directly with the peripheral interface service and the physical computing devices. However, because the peripheral interface service configures peripheral devices independently, the specific hardware configuration of the network interface utilized by individual peripheral devices (e.g., through a computing device or directly from the peripheral device) is not limited to any particular type. Additionally, the peripheral interface service can facilitate interaction with individual physical devices with multiple peripheral devices having different hardware configurations of the network interface.

The peripheral information exchanged between the peripheral devices and the virtual machine instances or between the peripheral devices and physical computing devices are facilitated utilizing a transport communication protocol. Illustratively, peripheral information is generated by the peripheral devices as information that is designed to be received on a communication bus associated with a computing device (e.g., a physical communication bus or a virtual communication bus). To facilitate the transmission of the peripheral information, the network interfaces can encapsulate the peripheral information to allow the peripheral information to be transmitted. Such peripheral information can include the peripheral information to be processed by the computing device as well as information that identifies the intended recipient device or devices, preferences for transport protocols, specific transport protocols configuration (e.g., whether or not security is enabled) or any additional information that facilitates the receipt of the peripheral information. By way of illustrative example, in one embodiment, the peripheral information can be embodied as a series of data packets to be transmitted via a serial bus associated with a computing device, such as in accordance with the USB protocol. In other embodiments, the peripheral information may need to be further processed to allow the peripheral information to be encapsulated, such as be causing the peripheral information to be packetized.

To transmit the peripheral information (e.g., the USB specified data packets), in one embodiment, the peripheral information can be encapsulated into a series of TCP/IP-based data packets that can be utilized to transport the peripheral information over the communication network. In another example, the peripheral information can be encapsulated into a series of UDP/IP based data packets that can be used to transport the peripheral information with a greater emphasis on speed. The transport protocols can include various point-to-point communications or point-to-multipoint communications and can further incorporate additional security, reliability, or throughput mechanisms, such as incorporating compression algorithms, parity algorithms, and the like. The encapsulated peripheral communications can be transmitted to various components of the service provider network, which can additional information or modify information as part of the routing process of the peripheral communications. For example, a peripheral interface service can supplement or modify the transport protocol communications to direct the encapsulated peripheral information to an intended destination device (e.g., modify a packet destination address or create a new encapsulated data packet with a different destination).

With continued reference to the illustrative example, the encapsulated peripheral information is eventually received by an interface on the virtual machine instance, physical computing device or other intermediary device. The receiving device can then processed the encapsulated peripheral information to remove the encapsulation information and have access to the peripheral information. If the peripheral information was processed to facilitate transmission, the receiving device can further process the peripheral information as well. Illustratively, the receiving computing device can then provide or utilize the de-encapsulated peripheral information as if they peripheral information was received by a direct connected peripheral device. For example, the receiving computing device can process USB-based peripheral information in accordance with a serial bus that is associated with the receiving computing device.

In one aspect, as described above, the peripheral interface service can facilitate configuration of peripheral devices. In this aspect, a computing device can include software applications that can transmit configuration requests to the peripheral interface service to identify peripheral devices and provide permissions, security information, customer identifications, and the like. In other embodiments, peripheral devices may also include sufficient computing resources to transmit the configuration request directly to the peripheral interface service. The peripheral interface service can then utilize the configuration request to identify one or more physical machines that can receive connection requests from the peripheral devices. In some embodiments, the peripheral interface service can identify both virtual machine instances and physical computing devices that can receive peripheral communications. The peripheral interface service can identify additional permission, security or authentication information that may be required as part of connecting the peripheral device with individual physical computing devices. The peripheral interface service can then store the configuration information for processing subsequent connection requests from one or peripheral devices.

In another aspect, the peripheral interface service can facilitate connection requests for configured peripheral devices. In this aspect, the peripheral devices can either transmit a connection request through a computing device or a local network interface. The connection request can include information identifying the peripheral device and optionally additional information, such as client identifiers, security information, permission information, and the like. The peripheral interface service processes the connection request to identify one or more physical computing devices that can be associated to exchange peripheral communications with the peripheral device, which can include input or output communications. If multiple physical computing devices (and possibly virtual hosted desktops) may be applicable, the peripheral interface service can facilitate the selection of individual physical computing devices automatically or via requested input. Based on processing the request and identification of a virtual desktop instance, the peripheral interface service can then facilitate the connection request to the identified physical machine.

Although aspects of some embodiments described in the disclosure will focus, for the purpose of illustration, on the illustrative interactions for requesting content and processing of content requests by network-based volumes with specific ranges of latencies, one skilled in the relevant art will appreciate that the examples are illustrative only and are not intended to be limiting. Still further, although the present application will be described with regard to illustrative to specific transport protocols, such as TCP/IP or UDP/IP and illustrative peripheral communication protocols, such as USB, such examples are illustrative in nature and should not be construed as limiting. Accordingly, one or more aspects of the present application may be applicable with regard to different network and peripheral communication protocols.

FIG. 1 is a block diagram depicting an illustrative logical network 100 including multiple computing devices 102 and a service provider network 110 in communication via a network 140. While the computing devices 102 are shown as a group within FIG. 1, the computing devices 102 may be geographically distant, and independently owned or operated. For example, the computing devices 102 could represent a multitude of users in various global, continental, or regional locations accessing the service provider system 110. Accordingly, the groupings of computing devices 102 within FIG. 1 is intended to represent a logical, rather than physical, grouping. Similarly, while one set of illustrative components is shown to represent the service provider system 110, multiple instances of each component may be present within the content management system 110, and such components may be located within geographically diverse areas (e.g., globally, continentally, or regionally), in order to provide a wide geographical presence for the content management system 110. As will be described in greater detail below, some computing devices 102 can include a software application 104 for communicating with the service provider system 110.

Computing devices 102A and 102B may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Computing device 102A may include one or more data stores (not shown in FIG. 1) including various applications or computer-executable instruction, used to implement the embodiments disclosed herein. Some of the computing devices 102A can also facilitate the interaction of peripheral devices connected to the computing device (directly or indirectly) and utilizing a network interface provided by the computing device. Still further, some of the computing devices 102A can be utilized to access peripheral devices via the peripheral interface service 128. As will be explained in greater detail below, some of the computing device, such as illustratively computing device 102B, may also include stand-alone peripheral devices configured with a network interface to establish communications directly with the service provider system 110 without requiring additional communications with a computing device.

Network 140 may be any wired network, wireless network, or combination thereof. In addition, the network 120 may be a personal area network, local area network, wide area network, cable network, satellite network, cellular telephone network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the computing devices 102 and the service provider system 110 is depicted as having a single connection to the network 140, individual components of the computing devices 102 and service provider system 110 may be connected to the network 140 at disparate points.

In accordance with embodiments, the service provider system 110 includes a set of hosting environments, illustrated in FIG. 1 as hosting environment 112, 116, 120, and 124. As described in further detail below, the hosting environments 112, 116, 120, and 124 can host one or more services 114, 118, 122, and 126. As will be discussed below, for purposes of illustration, some of the hosted services, such as services 114, 118, 122, and 124 may correspond to virtual machine instances that operate one or more applications on behalf of a customer/client and can host virtual desktop implementations. Examples can include, but are not limited to, virtual desktop implementation that can include an operating environment, software application, storage, and access to additional services provided by the service provider. The service provider system 110 can also include a peripheral interface service 128 that can process configuration requests for peripheral devices, which will be described in greater detail below.

It will be appreciated peripheral interface service 128 by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the hosting environment 112 and browser component 114 may be executed by one more virtual machines implemented in a hosted computing environment. Additionally, hosting and app data store 116 may correspond to multiple physical or virtual computing resources that may logically represented as a single component, but may be implement in a distributed manner.

Figure 2:
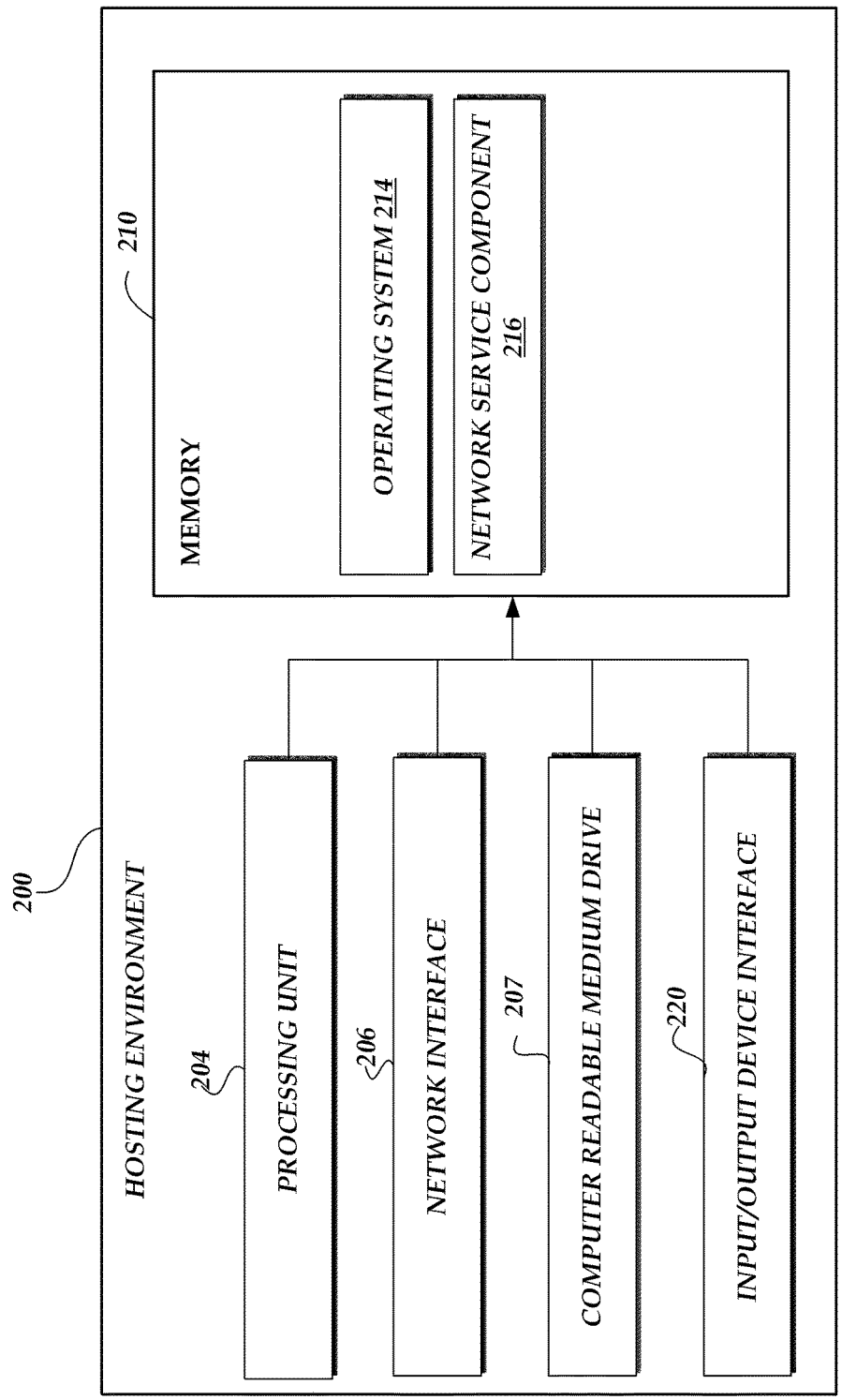
FIG. 2 is a block diagram of illustrative components of a hosting environment for hosting applications in accordance with the present application.

FIG. 2 depicts one embodiment of an architecture of an illustrative of hosting environment 200, such as hosting environment 112, 116, 120, and 124 that host virtualized applications, such as virtual desktop services 114, 118, 122, and 126 in accordance with the present application. The general architecture of the hosting environment depicted in FIG. 2 includes an arrangement of computer hardware and software components that may be used to implement aspects of the present disclosure. As illustrated, the hosting environment includes a processing unit 204, a network interface 206, a computer readable medium drive 207, an input/output device interface 220, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information. In some embodiments, the hosting environment may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the functionality implemented by the host computing device. The memory 210 may further include computer program instructions and other information for implementing aspects of the present disclosure. For example, in one embodiment, the memory 210 includes a host network service component 216 that corresponds to functionality provided by the instantiation of the host computing device illustrated in FIG. 1 as virtual desktop services 114, 118, 122, and 126. As illustrated in FIG. 2, the host environment 200 includes a network service component 216 for facilitating the exchange of peripheral communications with network-based peripherals via a communication network.

Figure 3A:
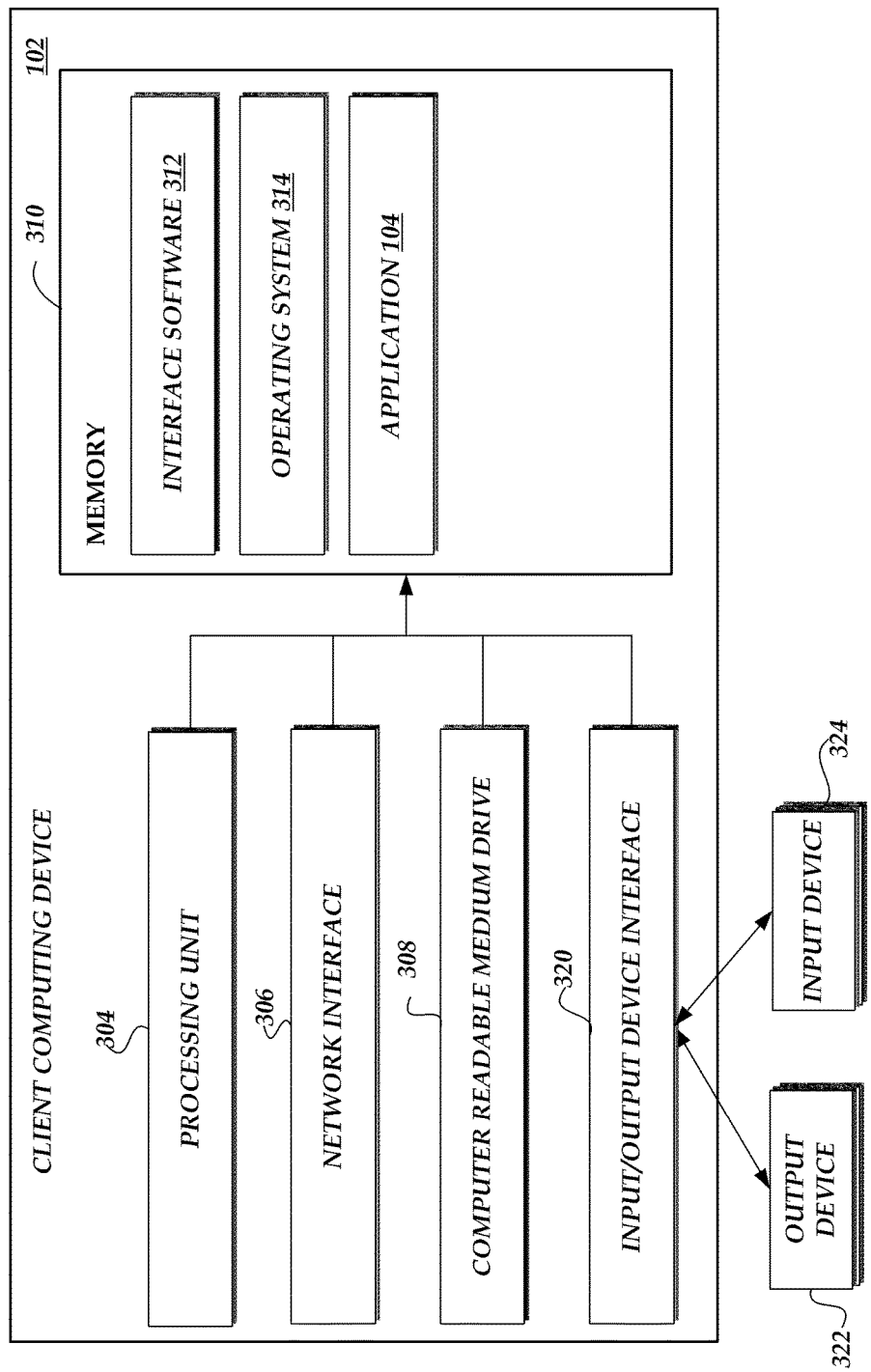
FIGS. 3A and 3B are block diagrams of illustrative components of a computing device for us use in configuring peripheral devices and transmitting peripheral device communications in accordance with the present application.

FIG. 3A depicts one embodiment of an architecture of an illustrative a computing device 102A that can generate and process browser content in accordance with the present application. The general architecture of the computing device 102B depicted in FIG. 3 includes an arrangement of computer hardware and software components that may be used to implement aspects of the present disclosure. As illustrated, the computing device 102A includes a processing unit 304, a network interface 306, a computer readable medium drive 307, an input/output device interface 320, one or more output devices 322, and one or more input devices 324, all of which may communicate with one another by way of a communication bus.

The network interface 306 may provide connectivity to one or more networks or computing systems, such as the network 140 of FIG. 1. The processing unit 304 may thus receive information and instructions from other computing systems or services via a network. The processing unit 304 may also communicate to and from memory 310 and the input/output device interface 320. The input/output device interface 320 may accept input from peripheral devices, such as input devices 324, which as previously described can include hardware components such as a keyboard, mouse, digital pen, etc. The input/output interface 320 can also generate outputs to peripheral devices, such as output devices 322, which can include hardware components such as displays, speakers, etc. The inputs to the computing device 102A may be internal to the device, such as contained within a housing, or external to the device and connected via a wired or wireless interface. Additionally, as will be described in detail below the input peripheral devices 324 and output peripheral devices 322 can utilize the network interface 306 and associated software applications to transmit and receive peripheral communications with the peripheral interface service 128 (FIG. 1).

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the user computing device 104. The memory 310 may further include computer program instructions and other information for implementing aspects of the present disclosure. For example, in one embodiment, the memory 310 includes an application 104 for communicating with the service provider system 110. More specifically, application 104 can be utilized to communicate with the peripheral interface service 128 to configure peripheral devices.

Figure 3B:
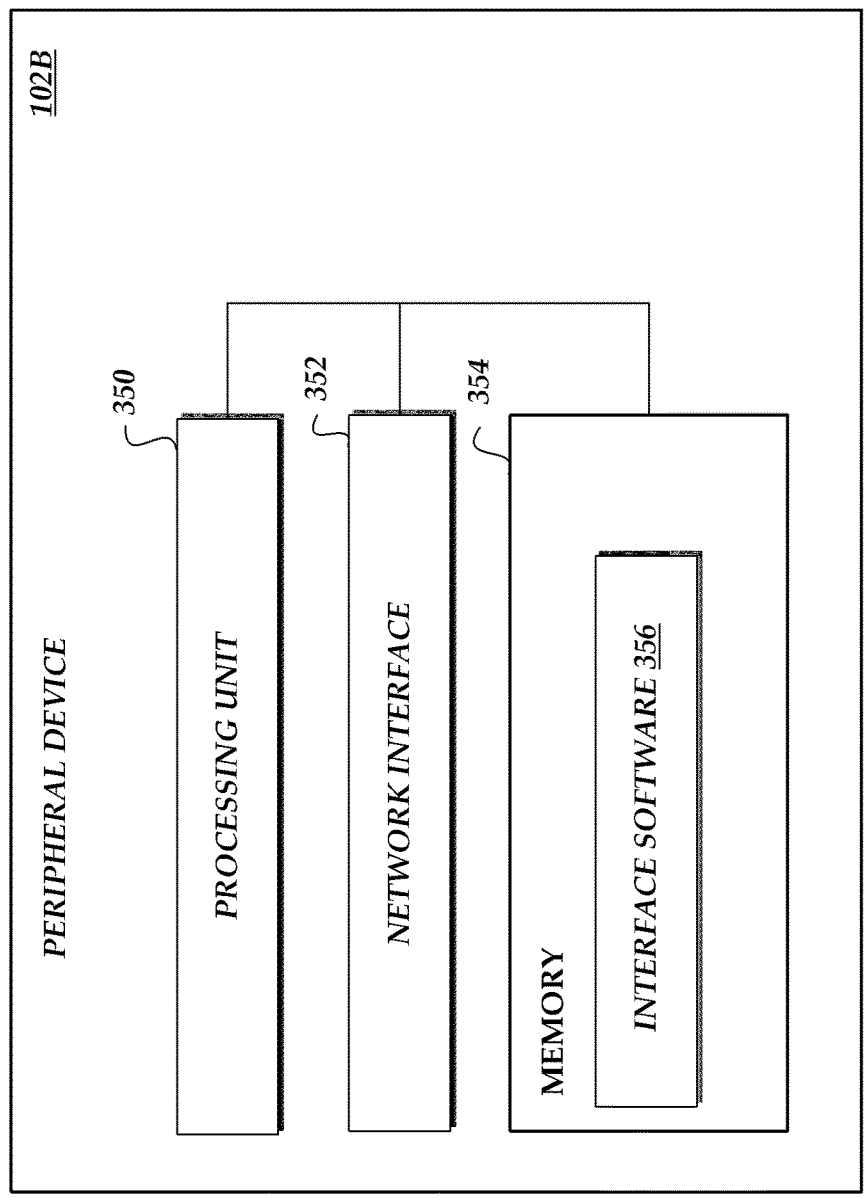

FIG. 3B depicts one embodiment of an alternative architecture of an illustrative computing device 102B in accordance with the present application. The general architecture of the computing device 102B depicted in FIG. 3B includes an arrangement of computer hardware and software components that may be used to implement aspects of the present disclosure. However, computing device 10B2 may be associated with a reduced of components that may limit the computing functionality and operation of the computing device 102B, such as implemented in stand-alone peripheral devices. As illustrated, the computing device 102B includes a processing unit 350 and a network interface 352 that communicate with a communication bus. Unlike computing device 102A of FIG. 3A, the computing device 102B may not have a computer readable medium drive, an input/output device interface, an optional display, or separate/additional input devices. In other instances, computing device 102B may have some additional limited resources, such as small display, that can facilitate in the configuration of the computing device 102B or generation of connection requests.

The network interface 352 may provide connectivity to one or more networks or computing systems, such as the network 140 of FIG. 1. The processing unit 350 may thus receive information and instructions from other computing systems or services via a network. The memory 354 may include computer program instructions that the processing unit 350 executes in order to implement one or more embodiments. The memory 354 generally includes RAM, ROM, or other persistent or non-transitory memory. In this embodiment, the memory 354 may not necessarily store or maintain a full operating system that provides computer program instructions for use by the processing unit 350 in the general administration and operation of the computing device 102. Rather, in one embodiment, the memory 354 includes an interface software component 356 for accessing receiving and processing instructions.

Figure 4:
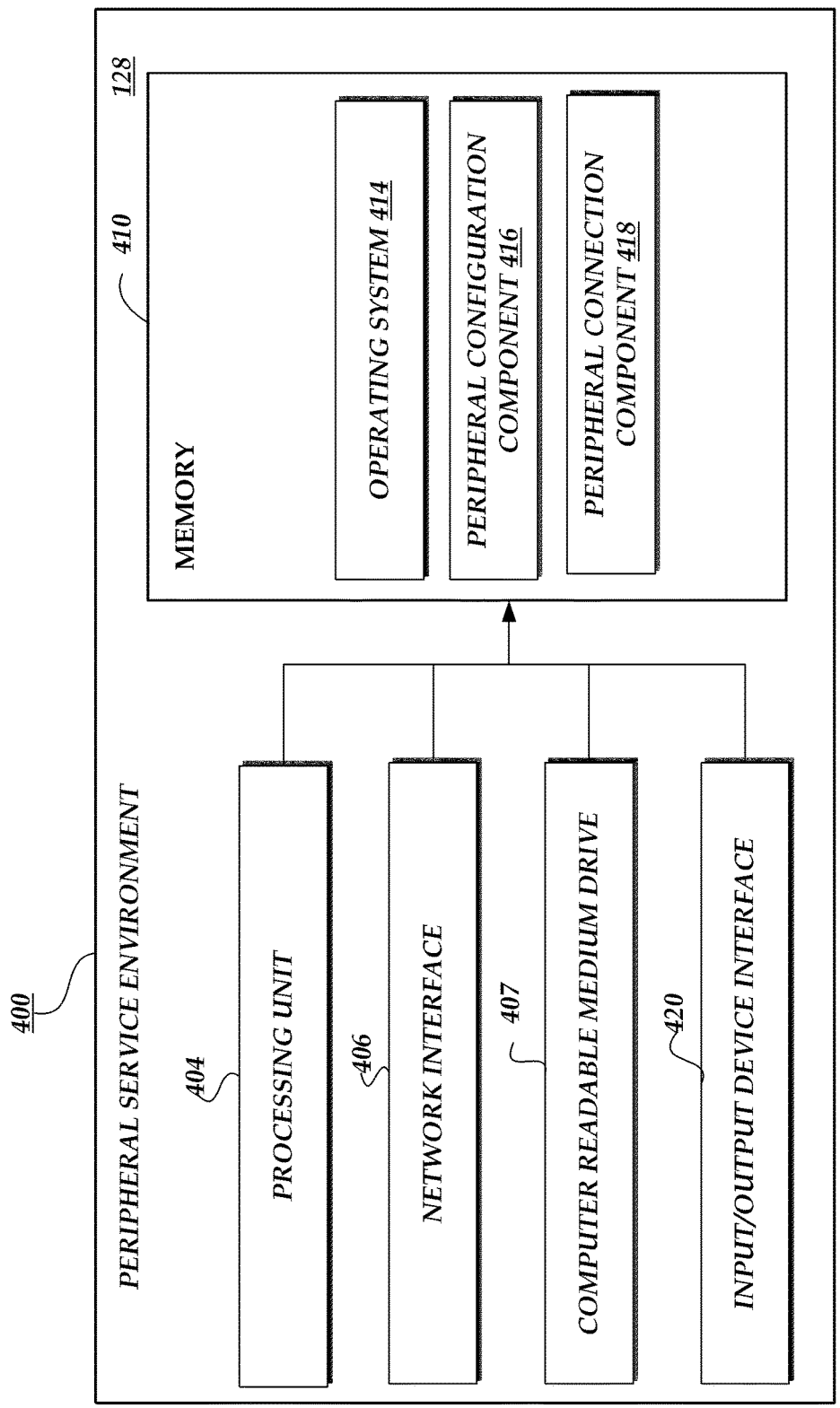
FIG. 4 is a block diagram of illustrative components of a peripheral device for communications in accordance with the present application.

As discussed above, in some embodiments, aspects of the present application can include network components 400 that facilitate the configuration of peripheral devices and connection of peripheral devices with virtual desktop instances and physical computing devices 120A. FIG. 4 depicts one embodiment of an architecture of an illustrative peripheral interface service component in communication with the service provider network 110 and computing devices 102 in accordance with the present application. The general architecture of the peripheral interface service depicted in FIG. 4 includes an arrangement of computer hardware and software components that may be used to implement aspects of the present disclosure. As illustrated, the hosting environment includes a processing unit 404, a network interface 406, a computer readable medium drive 407, an input/output device interface 420, all of which may communicate with one another by way of a communication bus.

The network interface 406 may provide connectivity to one or more networks or computing systems, such as the network 140 of FIG. 1. The processing unit 404 may thus receive information and instructions from other computing systems or services via a network. The processing unit 404 may also communicate to and from memory 410 and further provide output information. In some embodiments, the hosting environment may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the network routing component. The memory 210 may further include computer program instructions and other information for implementing aspects of the present disclosure. For example, in one embodiment, the memory 210 includes a configuration component 416 that corresponds to functionality provided by the component to configure peripheral devices as will be described illustratively with regard to FIG. 6. The memory 210 includes a peripheral connection component 418 for processing requests for connections between peripheral devices and virtual desktops instances as will be described illustratively with regard to FIG. 7.

Figure 5A:
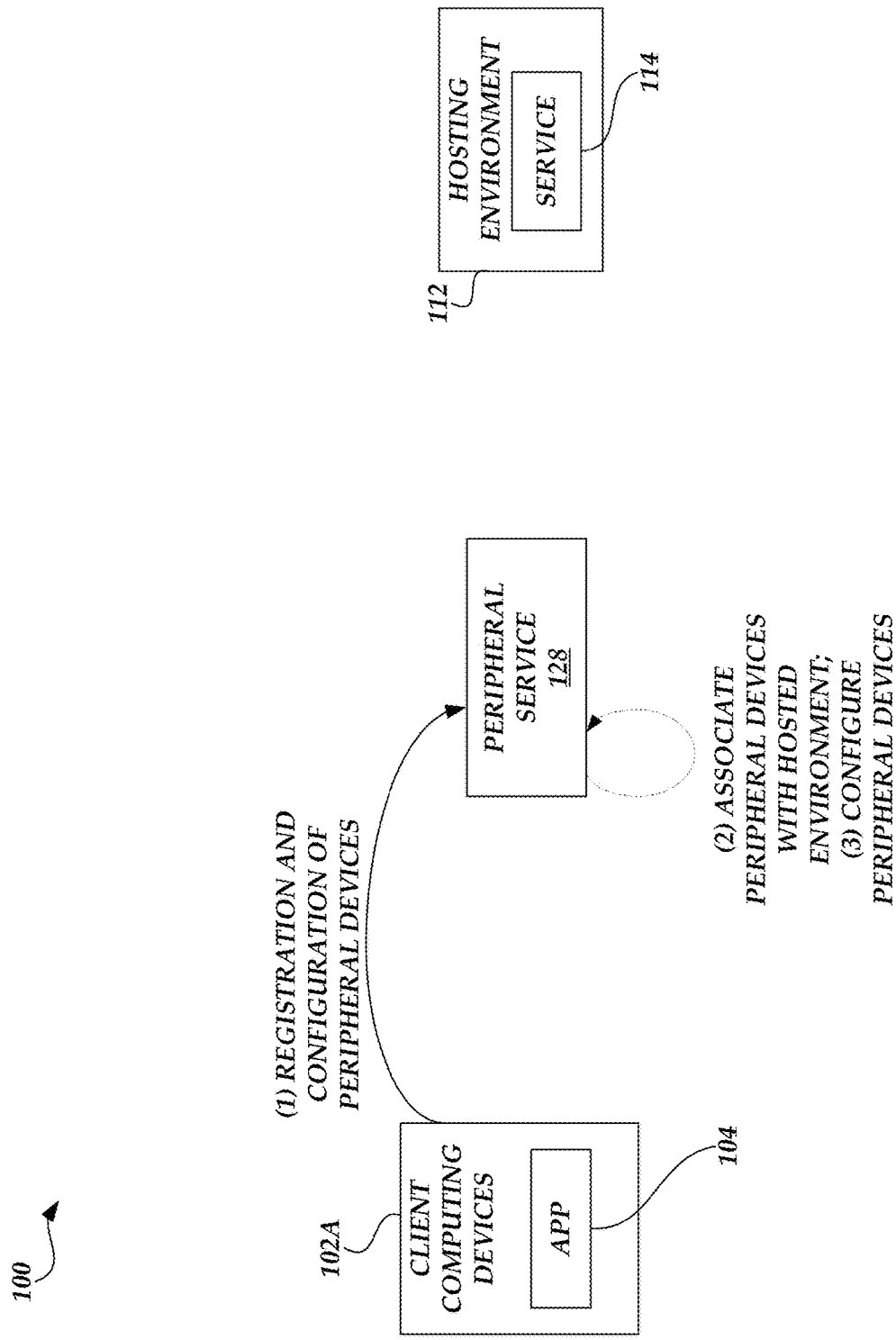
FIGS. 5A-5B are block diagrams of the logical network of FIG. 1 illustrating the configuration of peripheral devices and transmission of peripheral communications to a virtual machine instance utilizing a determined latency in accordance with the present application.
Figure 5B:
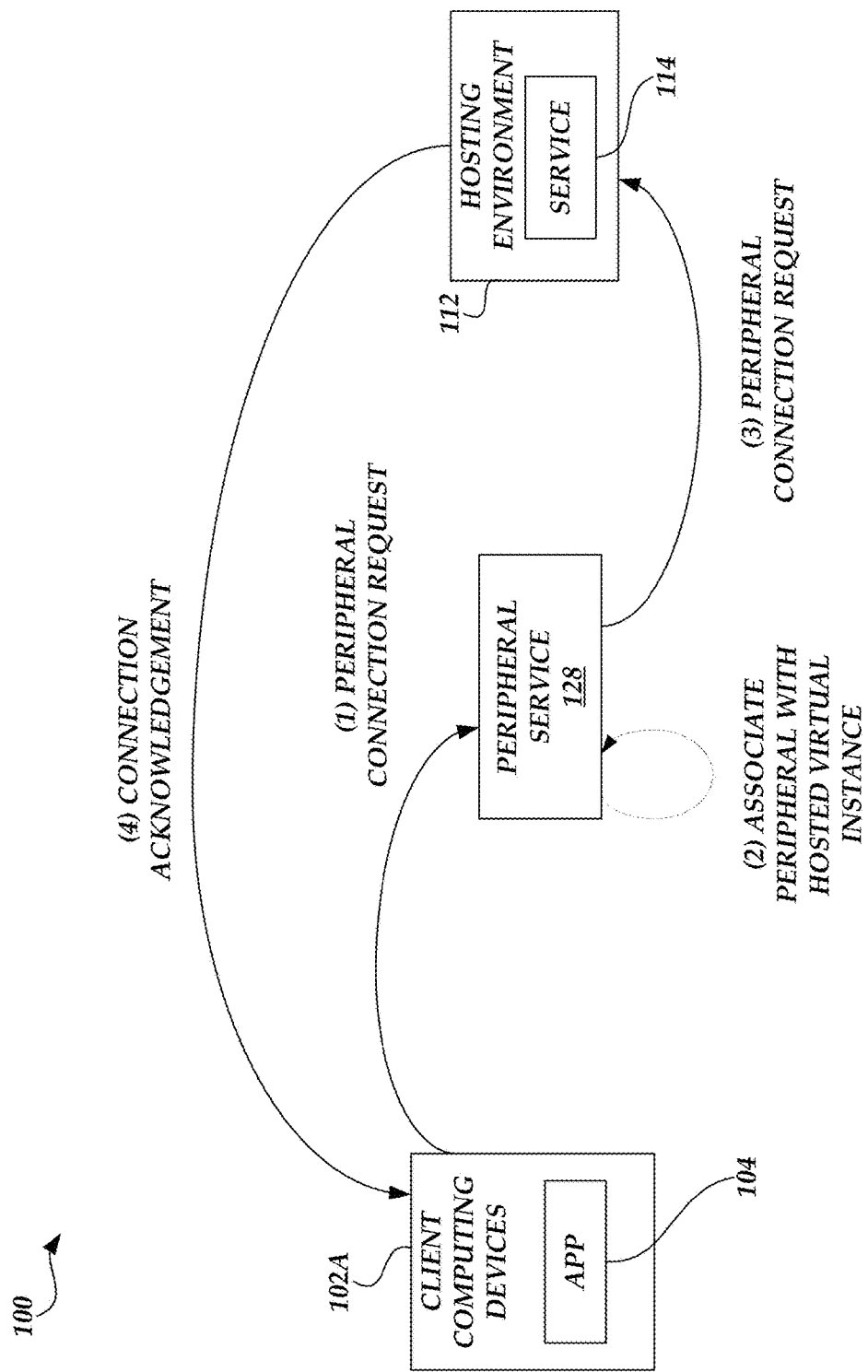

Turning now to FIGS. 5A-5B and 6A-6B and illustrative interactions between the components of the logical network 100 for configuration peripheral devices and processing requests to exchange peripheral communications with instantiated virtual machine instances, such as virtual desktops. FIGS. 5A and 5B will be described with regard to transmission of configuration requests from peripheral devices associated with a separate computing device, such as computing device 102A. Illustratively, the peripheral devices are in direct communication with the computing device 102A and utilize the network interface of the computing device 102A. Additionally, for purposes of an illustrative example, the same computing device 102A can execute the application 104 for facilitating the configuration of the peripheral device. Additionally, FIGS. 5A and 5B will be described with regard to transmission of connection requests between the peripheral device and a hosted virtual machine instance, such as hosted virtual desktop. As previously described, however, the peripheral devices can utilize the peripheral interface service 128 to exchange peripheral communications with physical computing devices.

Although FIGS. 5A-5B and 6A-6B will be described with regard to access interaction between one or more peripheral devices, the peripheral interface service 128, and one or more virtual machine instances 112 hosting virtual machine instances 114, one skilled in the relevant art will appreciate that present application is not limited to interaction by any specific type of computing device or virtual desktop instances.

With reference to FIG. 5A, at (1), the client computing device 102A initiates the configuration of one or more peripheral devices by transmitting a request to the peripheral interface service 128. Illustratively, the client computing device 102A can utilization application 104 to allow for the registration and configuration of one or more peripheral devices. Illustratively, the peripheral devices can be associated with the client computing device 102A via a direct connection to the client computing device 102A or via wireless communication, such as via near field communications. In this embodiment, the application 104 can obtain information utilized in the registration and configuration of the peripheral devices, such as device identifiers, peripheral devices specifications or capabilities (e.g., manufacturer information, software version, etc.) and the like. The application 104 can also receive preference information with regard to configuration of the peripheral device, such as performance optimization information, resource optimizations, and the like. The application 104 can also include restriction information that can be utilized by the peripheral interface service 128 in processing subsequent connection requests. For example, the restriction information can include a specification of specific virtual desktops or physical computing devices that are not accessible by peripheral devices, such as restricting a connection of external memory peripheral devices to some virtual desktops. In another example, the restriction information can identify specific times of day in which connections between peripheral devices and some (or all) virtual desktop instances or physical computing devices are limited or prohibited. Additionally, in other embodiments, the client computing device 102A may not have a connection to the client computing device 102A, but can be configured via input from a system administrator. In this embodiment, the application 104 can provide forms or drop down menus to receive the inputs and transmits the information via an API.

In addition to the registration of the peripheral devices, at (1), the client computing device 102A also transmits identification information for associating the peripheral device (s) with one or more hosted virtual desktops or one or more physical computing devices, such as client computing devices 102A. In this embodiment, the identification information can include client identifiers, user logon information, etc. Additionally, in other embodiments, the application can include various interfaces, such as selection buttons, drop-downs, etc. that allows a user to select from available hosted virtual desktops. In other embodiments, the selection of among multiple hosted virtual desktops can be implemented at a later point.

At (2), the peripheral interface service 128 receives and processes the request the registration and configuration requests. In one aspect, the peripheral interface service 128 can validate the request from the client computing device 102A, including but not limited to authentication and security information. At (3), the peripheral interface service 128 determines configuration for the peripheral device(s). Illustratively, the configuration of the devices can include the selection of communication protocols for transmitting peripheral communications, security configurations related to the peripheral communications, specific peripheral settings (e.g., sensitivity information, communication lag, etc.). In another example, the configuration of the peripheral devices can also include permission and restriction information that can affect the operation of the peripheral devices or how the hosted virtual desktop instances interpret peripheral device communications. For example, as described above, the restriction information can include the restriction of a time of day in which peripheral communications will be accepted. In another example, the restriction information can include a specification of a type of data that the peripheral device can access (e.g., no receipt of video information). In some embodiments, the peripheral interface service 128 can utilize information included in the request (as described above). In other embodiments, the peripheral interface service 128 can also utilize additional information, such as profile information or information transmitted via an API that provides the configuration information for individual peripheral devices, peripheral devices associated with particular customers, peripheral devices accessing specific hosted virtual desktop types or desktop instances, and the like. For example, a system administrator may provide restriction and permission information for all peripheral devices that are available to be connected to virtual desktop instances associated with a specification organization. In another example, a user can provide configuration information for all peripheral devices associated with a geographic area, home network, specific user, and the like. Although not illustrated in FIG. 5A, in some embodiments, the peripheral interface service 128 can provide acknowledgement communications regard the configuration of the peripheral devices, the availability of specific hosted virtual desktops (described above), and the like.

Turning now to FIG. 5B, for purpose of illustration, subsequent to registration and configuration, the peripheral interface service 128 can facilitate the processing of connection of peripheral device(s) and the subsequent direct exchange of peripheral communications between a hosted virtual desktop and peripheral devices. At (1), the peripheral interface service 128 obtains a connection request from one or more peripheral devices. As illustrated in FIG. 5B, the client computing device 102A transmits the request to the peripheral interface service 128. Illustratively, the request can be transmitted via the application 104 or initiated by a user wishing to access a peripheral device, such as a memory device attached to a physical computing device 102A. As similarly described above, the application 104 can obtain information utilized in the connection of the peripheral devices, such as device identifiers, peripheral devices specifications or capabilities (e.g., manufacturer information, software version, etc.) and the like. The application 104 can also receive preference information with regard to connection of the peripheral device, such as the specific type of communication protocols utilized in the communications, operational or preference information related to how the peripheral devices will operate (e.g., a preferred format for receiving data to be outputted), and the like. In some embodiments, the application 104 can maintain the information in a profile. Additionally, the application 104 can provide forms or drop down menus to receive the inputs and transmits the information via an API. In other embodiments, the application 104 can provide identifiers and allow the peripheral interface service 128 to access preference information via preference information maintained by the peripheral interface service 128 or accessed via another services, such as a configuration or preferences service.

At (2), the peripheral interface service 128 receives and processes the connection request. In one aspect, the peripheral interface service 128 can validate the request from the client computing device 102A, including but not limited to authentication and security information. Additionally, the peripheral interface service 128 associates one or more virtual desktop instances that are available for the exchange of communications with the requesting peripheral device(s). In some embodiments, if the configuration of the peripheral devices included permission and restriction information that can affect the operation of the peripheral devices or how the hosted virtual desktop instances interpret peripheral device communications, the peripheral interface service 128 can include the permission and restriction information as part of the processing. As described above, the peripheral interface service 128 can utilize information included in the connection request or previously provided in the configuration of the peripheral device(s). In other embodiments, the peripheral interface service 128 can also utilize additional information, such as profile information or information transmitted via an API that provides the configuration information for individual peripheral devices, peripheral devices associated with particular customers, peripheral devices accessing specific hosted virtual desktop types or desktop instances, and the like.

At (3), the peripheral interface service 128 transmits a connection request to one or more hosted virtual desktop instances or physical computing devices. Illustratively, the peripheral interface service 128 and the hosted virtual desktop instances may be part of the service provider network 110, which can facilitate the interactions between the peripheral interface service 128 and the hosted virtual desktops/physical computing devices. Such interaction may be direct from the peripheral interface service 128 or facilitated through other components or services provided in the service provider network. In other embodiments, the peripheral interface service 128 can utilize additional security or authentication protocols to establish communications. If multiple hosted virtual desktop instances are available, the peripheral interface service 128 can also elicit the selection of a specific hosted virtual desktop instance or utilization selection criteria previously provided. In another example, the peripheral interface service 128 can be configured with pre-determined criteria for making an automatic selection, such as a prioritized order for selection, preference information by time of day or desired function, preference information based on the source of the request, and the like. For purposes of illustration in FIG. 5B, the peripheral interface service 128 transmits the request to hosted virtual desktop instance 112. The peripheral interface service 128 can transmit permission and preference information to the selected hosted virtual desktop instance 112.

At (4), the specific hosted virtual desktop instance 112 can begin communications with the peripherals via the client computing device 102A. As previously described, the communications with between the peripherals and peripheral information exchanged between the peripheral devices (via the client computing device 102A) and the virtual machine instances 112 is facilitated via a transport protocol communication. The peripheral information is generated by the peripheral devices as information that is designed to be received on a communication bus associated with a computing device (e.g., a physical communication bus or a virtual communication bus). To facilitate the transmission of the peripheral information, the network interfaces of the client computing device 102A can encapsulate the peripheral information to allow the peripheral information to be transmitted. Such peripheral information can include the peripheral information to be processed by the computing device as well as information that identifies the intended recipient device or devices, preferences for transport protocols, specific transport protocols configuration (e.g., whether or not security is enabled) or any additional information that facilitates the receipt of the peripheral information. By way of illustrative example, in one embodiment, the peripheral information can be embodied as a series of data packets to be transmitted via a serial bus associated with a computing device. In other embodiments, the peripheral information may need to be further processed to allow the peripheral information to be encapsulated, such as be causing the peripheral information to be packetized.

To transmit the peripheral information (e.g., the USB specified data packets), in one embodiment, the peripheral information can be encapsulated into a series of TCP/IP-based data packets that can be utilized to transport the peripheral information over the communication network. In another example, the peripheral information can be encapsulated into a series of UDP/IP based data packets that can be used to transport the peripheral information with a greater emphasis on speed. The transport protocols can include various point-to-point communications or point-to-multipoint communications and can further incorporate additional security, reliability, or throughput mechanisms, such as incorporating compression algorithms, parity algorithms, and the like. The encapsulated peripheral communications can be transmitted to various components of the service provider network, which can additional information or modify information as part of the routing process of the peripheral communications. For example, a peripheral interface service can supplement or modify the transport protocol communications to direct the encapsulated peripheral information to an intended destination device (e.g., modify a packet destination address or create a new encapsulated data packet with a different destination).

With continued reference to FIG. 5B, the encapsulated peripheral information is eventually received by an interface on the virtual machine instance 112 (or physical computing device or other intermediary device). The receiving device can then processed the encapsulated peripheral information to remove the encapsulation information and have access to the peripheral information. If the peripheral information was processed to facilitate transmission, the receiving device can further process the peripheral information as well. Illustratively, the receiving computing device can then provide or utilize the de-encapsulated peripheral information as if they peripheral information was received by a direct connected peripheral device. For example, the receiving computing device can process USB-based peripheral information in accordance with a serial bus that is associated with the receiving computing device.

Figure 6B:
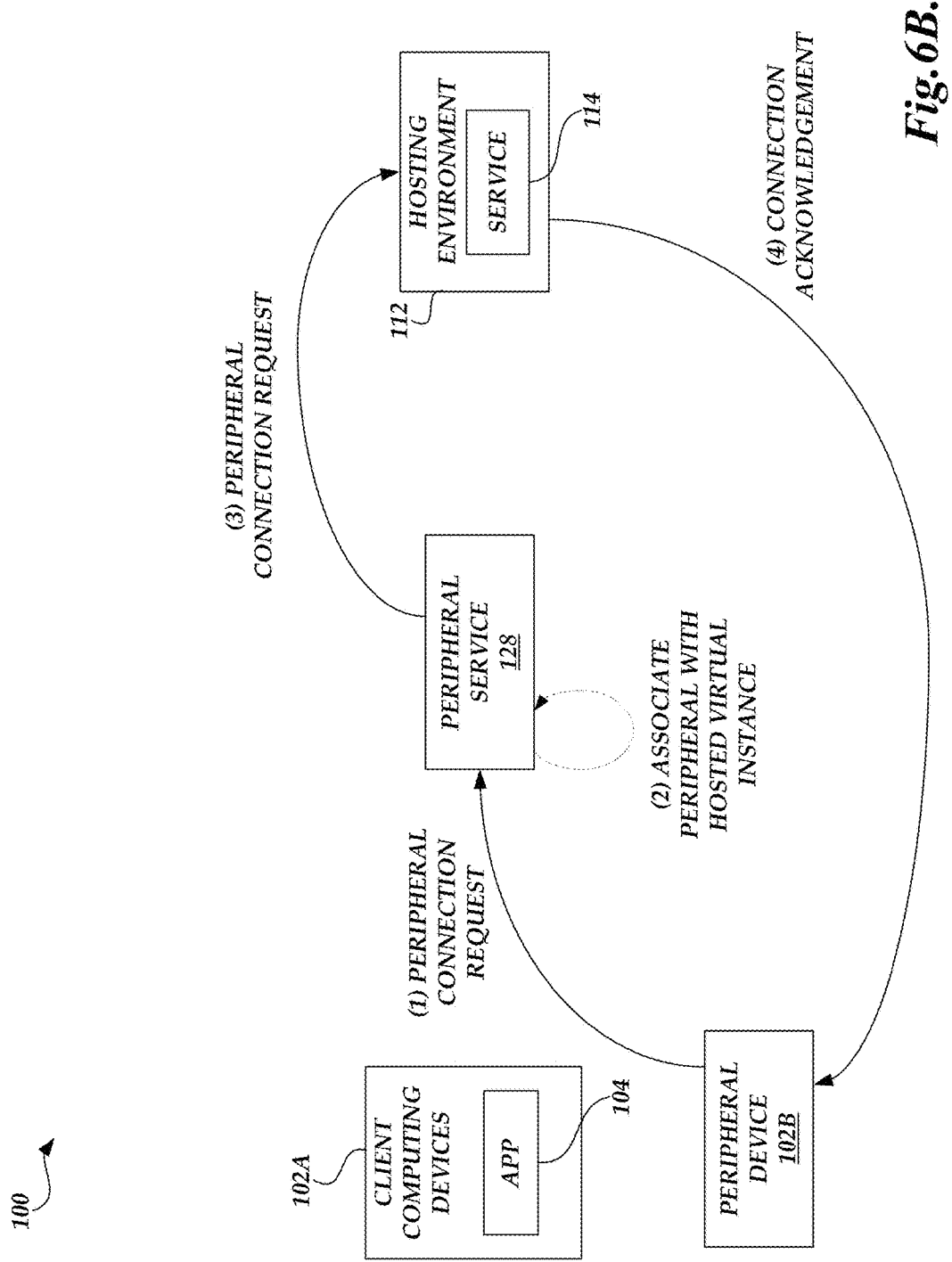

FIGS. 6A and 6B will be described with regard to transmission of configuration requests from peripheral devices, such as computing device 102B, that will transmit peripheral communications without the need of a separate computing device for network interface connectivity. However, for purposes of an illustrative example, in FIGS. 6A-6B, a separate computing device, such as computing device 102A, can execute the application 104 for facilitating the configuration of the peripheral device. As similar described with regard to FIGS. 5A and 5B, FIGS. 6A and 6B will be described with regard to transmission of connection requests between the peripheral device and a hosted virtual machine instance, such as hosted virtual desktop. As previously described, however, the peripheral devices can utilize the peripheral interface service 128 to exchange peripheral communications with physical computing devices. With reference to FIG. 6A, at (1), the computing device 102B (e.g., a standalone peripheral device) transmits a registration request to the computing device 102A. In this embodiment, the computing device 102B can connect directly to the client computing devices 102A via a physical connection or wireless communication. The registration request can include information to be included in the subsequent connection request transmission from the client computing device 102A. Illustratively, the client computing device 102A can utilization application 104 to allow for the registration and configuration of one or more peripheral devices. Illustratively, the peripheral devices can be associated with the client computing device 102A via a direct connection to the client computing device 102A or via wireless communication, such as via near field communications. In this embodiment, the application 104 can obtain information utilized in the registration and configuration of the peripheral devices, such as device identifiers, peripheral devices specifications or capabilities (e.g., manufacturer information, software version, etc.) and the like. The application 104 can also receive preference information with regard to configuration of the peripheral device, such as performance optimization information. Additionally, in other embodiments, the client computing device 102A may not have a connection to the client computing device 102A, but can be configured via input from a system administrator. In this embodiment, the application 104 can provide forms or drop down menus to receive the inputs and transmits the information via an API.

In addition to the registration of the peripheral devices, at (2), the client computing device 102A also transmits identification information for associating the peripheral device(s) with one or more hosted virtual desktops. In this embodiment, the identification information can include client identifiers, user logon information, etc. Additionally, in other embodiments, the application can include various interfaces, such as selection buttons, drop-downs, etc. that allows a user to select from available hosted virtual desktops. In other embodiments, the selection of among multiple hosted virtual desktops can be implemented at a later point.

At (3), the peripheral interface service 128 receives and processes the request the registration and configuration requests. In one aspect, the peripheral interface service 128 can validate the request from the client computing device 102A, including but not limited to authentication and security information. At (4), the peripheral interface service 128 determines configuration for the peripheral device(s). Illustratively, the configuration of the devices can include the selection of communication protocols for transmitting peripheral communications, security configurations related to the peripheral communications, specific peripheral settings (e.g., sensitivity information, communication lag, etc.). In another example, the configuration of the peripheral devices can also include permission and restriction information that can affect the operation of the peripheral devices or how the hosted virtual desktop instances interpret peripheral device communications. For example, the restriction information can include the restriction of a time of day in which peripheral communications will be accepted. In another example, the restriction information can include a specification of a type of data that the peripheral device can access (e.g., no receipt of video information). In some embodiments, the peripheral interface service 128 can utilize information included in the request. In other embodiments, the peripheral interface service 128 can also utilize additional information, such as profile information or information transmitted via an API that provides the configuration information for individual peripheral devices, peripheral devices associated with particular customers, peripheral devices accessing specific hosted virtual desktop types or desktop instances, and the like. Although not illustrated in FIG. 6A, in some embodiments, the peripheral interface service 128 can provide acknowledgement communications regard the configuration of the peripheral devices, the availability of specific hosted virtual desktops (described above), and the like.

Turning now to FIG. 6B, for purpose of illustration, subsequent to registration and configuration, the peripheral interface service 128 can facilitate the processing of connection of peripheral device(s) and the subsequent direct exchange of peripheral communications between a hosted virtual desktop/physical computing devices and peripheral devices. At (1), the peripheral interface service 128 obtains a connection request from one or more peripheral device. As illustrated in FIG. 6B, the client computing device 102A does not transmit the request to the peripheral interface service 128. Rather, the client computing device 102B can utilize a locally available network interface to transmit the request. In some embodiments, the client computing device 102B can have a minimum software controls to generate a request signal. Alternatively, the request can be transmitted via the application 104 if the client computing device 102B has sufficient capability. As similarly describe above, the client computing device 102B or the application 104 can provide information utilized in the connection of the peripheral devices, such as device identifiers, peripheral devices specifications, or capabilities (e.g., manufacturer information, software version, etc.) and the like. In other embodiments, the connection request can be initiated by a computing device, such as a client computing device 102A attempting to access a memory device attached to another computing device.

At (2), the peripheral interface service 128 receives and processes the connection request. In one aspect, the peripheral interface service 128 can validate the request from the client computing device 102B, including but not limited to authentication and security information. Additionally, the peripheral interface service 128 associates one or more virtual desktop instances (or physical computing devices) that are available for the exchange of communications with the requesting peripheral device(s). In some embodiments, if the configuration of the peripheral devices included permission and restriction information that can affect the operation of the peripheral devices or how the hosted virtual desktop instances interpret peripheral device communications, the peripheral interface service 128 can include the permission and restriction information as part of the processing. As described above, the peripheral interface service 128 can utilize information included in the connection request or previously provided in the configuration of the peripheral device(s). In other embodiments, the peripheral interface service 128 can also utilize additional information, such as profile information or information transmitted via an API that provides the configuration information for individual peripheral devices, peripheral devices associated with particular customers, peripheral devices accessing specific hosted virtual desktop types or desktop instances, and the like.

At (3), the peripheral interface service 128 transmits a connection request to one or more hosted virtual desktop instances. Illustratively, the peripheral interface service 128 and the hosted virtual desktop instances may be part of the service provider network 110, which can facilitate the interactions between the peripheral interface service 128 and the hosted virtual desktops. Such interaction may be direct from the peripheral interface service 128 or facilitated through other components or services provided in the service provider network. In other embodiments, the peripheral interface service 128 can utilize additional security or authentication protocols to establish communications. If multiple hosted virtual desktop instances are available, the peripheral interface service 128 can also elicit the selection of a specific hosted virtual desktop instance or utilization selection criteria previously provided. For purposes of illustration in FIG. 6B, the peripheral interface service 128 transmits the request to hosted virtual desktop instance 112. The peripheral interface service 128 can transmit permission and preference information to the selected hosted virtual desktop instance 112.

At (4), the specific hosted virtual desktop instance 112 can begin communications with the peripherals associated with the client computing device 102B. As previously described, the communications with between the peripherals and peripheral information exchanged between the client computing devices (e.g. peripheral devices) 102B and the virtual machine instances 112 is facilitated via a transport protocol communication. The peripheral information is generated by the peripheral devices as information that is designed to be received on a communication bus associated with a computing device (e.g., a physical communication bus or a virtual communication bus). To facilitate the transmission of the peripheral information, the network interfaces of the client computing device (e.g. peripheral device) 102B can encapsulate the peripheral information to allow the peripheral information to be transmitted. Such peripheral information can include the peripheral information to be processed by the computing device as well as information that identifies the intended recipient device or devices, preferences for transport protocols, specific transport protocols configuration (e.g., whether or not security is enabled) or any additional information that facilitates the receipt of the peripheral information. By way of illustrative example, in one embodiment, the peripheral information can be embodied as a series of data packets to be transmitted via a serial bus associated with a computing device. In other embodiments, the peripheral information may need to be further processed to allow the peripheral information to be encapsulated, such as be causing the peripheral information to be packetized.

To transmit the peripheral information (e.g., the USB specified data packets), in one embodiment, the peripheral information can be encapsulated into a series of TCP/IP-based data packets that can be utilized to transport the peripheral information over the communication network. In another example, the peripheral information can be encapsulated into a series of UDP/IP based data packets that can be used to transport the peripheral information with a greater emphasis on speed. The transport protocols can include various point-to-point communications or point-to-multipoint communications and can further incorporate additional security, reliability, or throughput mechanisms, such as incorporating compression algorithms, parity algorithms, and the like. The encapsulated peripheral communications can be transmitted to various components of the service provider network, which can additional information or modify information as part of the routing process of the peripheral communications. For example, a peripheral interface service can supplement or modify the transport protocol communications to direct the encapsulated peripheral information to an intended destination device (e.g., modify a packet destination address or create a new encapsulated data packet with a different destination).

With continued reference to FIG. 6B, the encapsulated peripheral information is eventually received by an interface on the virtual machine instance 112 (or physical computing device or other intermediary device). The receiving device can then processed the encapsulated peripheral information to remove the encapsulation information and have access to the peripheral information. If the peripheral information was processed to facilitate transmission, the receiving device can further process the peripheral information as well. Illustratively, the receiving computing device can then provide or utilize the de-encapsulated peripheral information as if they peripheral information was received by a direct connected peripheral device. For example, the receiving computing device can process USB-based peripheral information in accordance with a serial bus that is associated with the receiving computing device.

Figure 7:
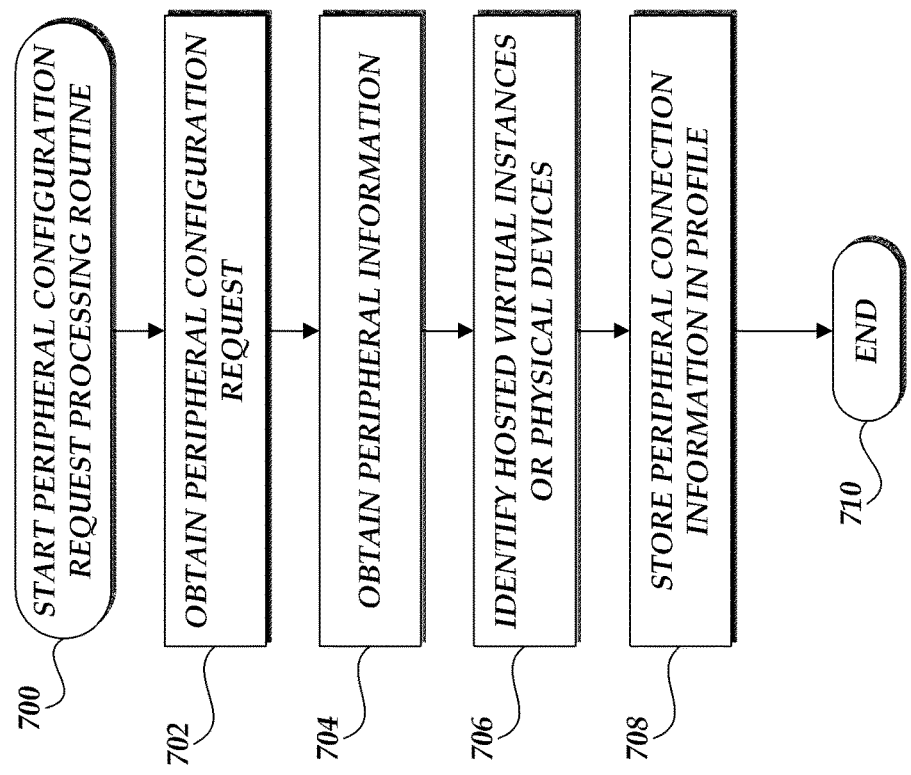
FIG. 7 is a flow diagram illustrative of a peripheral device configuration routine by a computing device in accordance with the present application.

FIG. 7 is a flow diagram illustrative of a peripheral configuration request processing routine 700 implemented by a computing device in accordance with the present application. Illustratively, routine 700 will be described with regard to implementation by a peripheral interface service 128 (FIG. 1). However, routine 700 may be implemented by other computing devices, in whole or in part. At block 702, the peripheral interface service 128 obtains the registration request. As previously described in one embodiment, the registration and configuration request is transmitted from a device, such as client computing device 102A. Illustratively, the registration request can include information to be included in the subsequent connection request transmission from the client computing device 102A. For example, the client computing device 102A can utilization application 104 to allow for the registration and configuration of one or more peripheral devices. In this embodiment, the application 104 can obtain information utilized in the registration and configuration of the peripheral devices, such as device identifiers, peripheral devices specifications or capabilities (e.g., manufacturer information, software version, etc.) and the like. The application 104 can also receive preference information with regard to configuration of the peripheral device, such as performance optimization information. Additionally, in other embodiments, the client computing device 102A may not have a connection to the client computing device 102A, but can be configured via input from a system administrator. In this embodiment, the application 104 can provide forms or drop down menus to receive the inputs and transmits the information via an API.

In addition to the registration of the peripheral devices, the client computing device 102A also transmits identification information for associating the peripheral device(s) with one or more hosted virtual desktops. In this embodiment, the identification information can include client identifiers, user logon information, etc. Additionally, in other embodiments, the application can include various interfaces, such as selection buttons, drop-downs, etc. that allows a user to select from available hosted virtual desktops. In other embodiments, the selection of among multiple hosted virtual desktops can be implemented at a later point.

At block 704, the peripheral interface service 128 determines configuration for the peripheral device(s). Illustratively, the configuration of the devices can include the selection of communication protocols for transmitting peripheral communications (e.g., IP-based communications of peripheral communications), security configurations related to the peripheral communications, specific peripheral settings (e.g., sensitivity information, communication lag, etc.). In another example, the configuration of the peripheral devices can also include permission and restriction information that can affect the operation of the peripheral devices or how the hosted virtual desktop instances interpret peripheral device communications. For example, the restriction information can include the restriction of a time of day in which peripheral communications will be accepted. In another example, the restriction information can include a specification of a type of data that the peripheral device can access (e.g., no receipt of video information). In some embodiments, the peripheral interface service 128 can utilize information included in the request. In other embodiments, the peripheral interface service 128 can also utilize additional information, such as profile information or information transmitted via an API that provides the configuration information for individual peripheral devices, peripheral devices associated with particular customers, peripheral devices accessing specific hosted virtual desktop types or desktop instances, and the like. In some embodiments, the peripheral interface service 128 can provide acknowledgement communications regard the configuration of the peripheral devices, the availability of specific hosted virtual desktops (described above), and the like.

At block 706, the peripheral interface service 128 identifies one or more hosted virtual machine instances or physical machines that are available for subsequent connection. In this embodiment, the identification information can include client identifiers, user logon information, etc. Additionally, in other embodiments, the application can include various interfaces, such as selection buttons, drop-downs, etc. that allows a user to select from available hosted virtual desktops. In other embodiments, the selection of among multiple hosted virtual desktops can be implemented at a later point. At block 708, the peripheral interface service 128 stores the configuration information for the peripheral devices.

Figure 8:
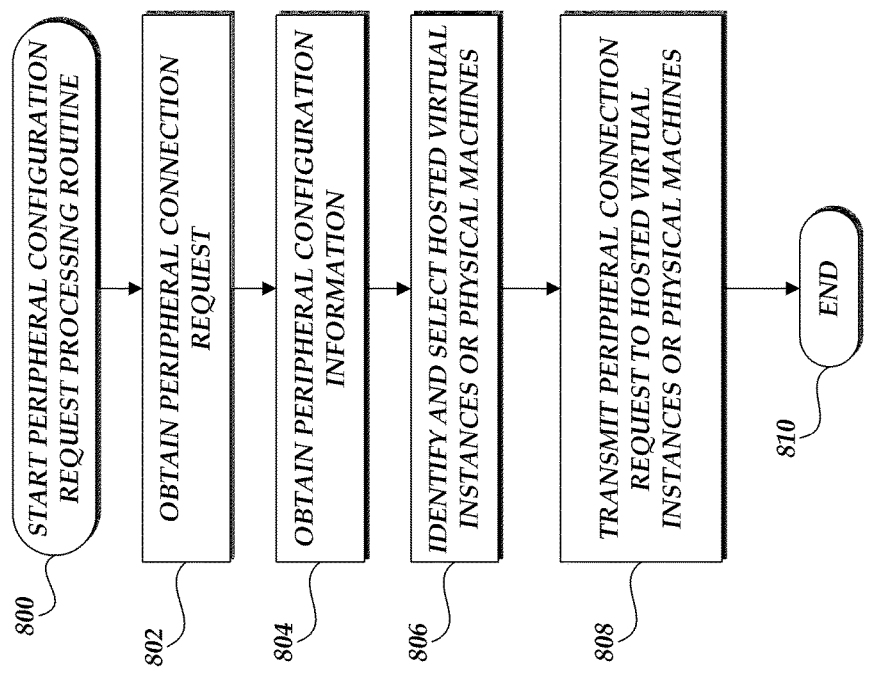
FIG. 8 is a flow diagram illustrative of a peripheral device connection routine implemented by a computing device in accordance with the present application.

Turning now to FIG. 8, a routine 800 implemented by a computing device for processing connection requests will be described. Illustratively, routine 800 will be described with regard to implementation by a peripheral interface service 128 (FIG. 1). However, routine 800 may be implemented by other computing devices, in whole or in part. At block 802, the peripheral interface service 128 obtains a connection request to connect to one or more peripheral device(s). As illustrated in FIG. 6A, in one embodiment, the connection request can be transmitted from a client computing device 102A that provides network interfaces for the peripheral devices. As illustrated in FIG. 6B, in another embodiment, the client computing device 102A does not transmit the request to the peripheral interface service 128. Rather, the client computing device 102B can utilize a locally available network interface to transmit the request. In some embodiments, the client computing device 102B can have a minimum software controls to generate a request signal. Alternatively, the request can be transmitted via the application 104 if the client computing device 102B has sufficient capability. As similarly describe above, the client computing device 102B or the application 104 can provide information utilized in the connection of the peripheral devices, such as device identifiers, peripheral devices specifications, or capabilities (e.g., manufacturer information, software version, etc.) and the like. Still further, the connection request can be initiated in other embodiments by a client computing device 102A.

At block 804, the peripheral interface service 128 receives and processes the connection request. In one aspect, the peripheral interface service 128 can validate the request from the client computing device 102B, including but not limited to authentication and security information. Additionally, the peripheral interface service 128 associates one or more virtual desktop instances that are available for the exchange of communications with the requesting peripheral device(s). In some embodiments, if the configuration of the peripheral devices included permission and restriction information that can affect the operation of the peripheral devices or how the hosted virtual desktop instances interpret peripheral device communications, the peripheral interface service 128 can include the permission and restriction information as part of the processing. As described above, the peripheral interface service 128 can utilize information included in the connection request or previously provided in the configuration of the peripheral device(s). In other embodiments, the peripheral interface service 128 can also utilize additional information, such as profile information or information transmitted via an API that provides the configuration information for individual peripheral devices, peripheral devices associated with particular customers, peripheral devices accessing specific hosted virtual desktop types or desktop instances, and the like. At block 806, the peripheral interface service 128 obtains a selection of a hosted virtual machine instance or physical computing device. In this embodiment, the identification information can include client identifiers, user logon information, etc. Additionally, in other embodiments, the application can include various interfaces, such as selection buttons, drop-downs, etc. that allows a user to select from available hosted virtual desktops. In other embodiments, the selection of among multiple hosted virtual desktops can be implemented at a later point. Additionally, the peripheral interface service 128 can also utilize selection rules or logic that allows for the automatic selection of a virtual machine instances or physical computing device.

At block 808, the peripheral interface service 128 transmits a connection request to one or more hosted virtual desktop instances. Illustratively, the peripheral interface service 128 and the hosted virtual desktop instances may be part of the service provider network 110, which can facilitate the interactions between the peripheral interface service 128 and the hosted virtual desktops. Such interaction may be direct from the peripheral interface service 128 or facilitated through other components or services provided in the service provider network. In other embodiments, the peripheral interface service 128 can utilize additional security or authentication protocols to establish communications. If multiple hosted virtual desktop instances are available, the peripheral interface service 128 can also elicit the selection of a specific hosted virtual desktop instance or utilization selection criteria previously provided. For purposes of illustration in FIG. 6B, the peripheral interface service 128 transmits the request to hosted virtual desktop instance 112. The peripheral interface service 128 can transmit permission and preference information to the selected hosted virtual desktop instance 112. At (4), the specific hosted virtual desktop instance 112 can begin communications with the peripherals associated with the client computing device 102B. At block 810, the routine 800 terminates.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing peripheral devices in a networked environment comprising:
   obtaining, by a peripheral interface service, a configuration request for at least one peripheral device;
   identifying, by the peripheral interface service, one or more hosted virtual machine instances associated with virtual desktop instances;
   storing, by the peripheral interface service, configuration information, the configuration information associated with the identified one or more hosted virtual machine instances associated with virtual desktop instances;
   obtaining, by the peripheral interface service, a connection request corresponding to a peripheral device, wherein the connection request is transmitted via a communication network;
   obtaining, by the peripheral interface service, the stored configuration information;
   identifying, by the peripheral interface service, a hosted virtual machine instance associated with a virtual desktop instance based, at least in part, on the configuration information; and
   transmitting, by the peripheral interface service, a connection request to the identified hosted virtual machine instance associated with the virtual desktop instance to establish peripheral communications between the peripheral device and the hosted virtual machine instance associated with the virtual desktop instance.

2. The method as recited in claim 1, wherein the peripheral device is at least one of an input device or an output device.

3. The method as recited in claim 1, wherein obtaining the connection request from the peripheral device includes obtaining a connection request from a peripheral device associated with a network interface associated with a separate computing device.

4. The method as recited in claim 1, wherein obtaining the connection request from the peripheral device includes obtaining a connection request from a peripheral device associated an independent network interface.

5. A system for managing network based peripheral communications comprising:
   one or more computing devices having a processor and a memory, the one or more computing devices configured to execute computer-readable instructions to remote desktop instance corresponding to host virtual machine instances configured to exchange peripheral communications via a communication network;
   one or more computing devices having a processor and a memory, the one or more computing devices configured to execute computer-readable instructions to exchange peripheral communications via a communication network; and
   one or more computing devices having a processor and a memory, the one or more computing devices configured to execute computer-readable instructions to implement a peripheral interface service operable to:
      obtain a connection request corresponding to a peripheral device configured to exchange peripheral communications via the communication network;
      identify at least one of a hosted virtual machine instance or physical computing device to associate to the connection request based on stored obtained configuration information corresponding to the peripheral device; and
      transmit a connection request to the identified at least one hosted virtual machine instance to cause a subsequent communication of peripheral communications between the peripheral device and the identified at least one of a hosted virtual machine instance or physical computing device via the communication network.

6. The system as recited in claim 5, wherein the peripheral device includes at least one of an input device configured to transmit peripheral communications and an output device configured to receive peripheral communications.

7. The system as recited in claim 6, wherein the at least one input device a keyboard, mouse, microphone, headset, memory device, touch screen, pen, video camera, or still cameras.

8. The system as recited in claim 6, wherein the at least one output device includes a monitor, display, projector, memory device, speaker, or tactile feedback apparatus.

9. The system as recited in claim 5, wherein the peripheral device includes a network interface to transmit peripheral communications via the communication network.

10. The system as recited in claim 5, wherein the peripheral device includes an interface to transmit peripheral communications via the communication network via a separate computing device.

11. The system as recited in claim 5, wherein the peripheral interface service identifies at least one of a hosted virtual machine instance or physical device to associate to the connection request based on a customer identifier included in the connection request.

12. The system as recited in claim 5, wherein the peripheral interface service identifies at least one hosted virtual machine instance to associate to the connection request based on a customer selection between two or more hosted virtual machine instances and physical computing devices.

13. The system as recited in claim 5, wherein the peripheral interface service identifies at least one of a hosted virtual machine instance or physical computing device to associate to the connection request based on evaluation of configuration information and selection of a at least one hosted virtual machine instance or physical computing device from two or more available hosted virtual machine instances and physical computing devices.

14. The system as recited in claim 5, wherein the peripheral interface service is further configured to:
obtain a configuration request for at least one peripheral device; and
store configuration information identifying one or more virtual machine instances and physical computing devices based on association with a customer.

15. The system as recited in claim 5, wherein the peripheral interface service transmits permission information as part of the connection request.

16. The system as recited in claim 5, wherein the peripheral interface service transmits security information as part of the connection request.

17. The system as recited in claim 5, wherein the peripheral interface service is further configured to:
obtain a second connection request corresponding to a second peripheral device configured to exchange peripheral communications via the communication network;
identify the least one of a hosted virtual machine instance and physical computing device to associate to the second connection request based on stored configuration information corresponding to the second peripheral device; and
transmit a second connection request to the identified at least one hosted virtual machine instance to cause a subsequent communication between the second peripheral device and the identified at least one of a hosted virtual machine instance and physical computing device via the communication network.

18. A non-transitory computer readable-medium having computer-executable instructions that when executed by a computing device having a processor and a memory cause the computing device to:
obtain a connection request corresponding to a peripheral device configured to exchange peripheral communications via a communication network;
identify at least one of a hosted virtual machine instance or physical computing device to associate to the connection request based on obtained configuration information corresponding to the peripheral device; and
transmit a connection request to the identified at least one of a hosted virtual machine instance or physical computing device to cause a subsequent communication of peripheral communications between the peripheral device and the identified at least one of a hosted virtual machine instance or physical computing device via the communication network.

19. The non-transitory computer-readable medium as recited in claim 18, wherein identifying at least one of a remote desktop instance on a hosted virtual machine instance or physical computing device to associate to the connection request based on stored configuration information corresponding to the peripheral device includes identifying a single hosted virtual machine instance to associate to the connection request.

20. The non-transitory computer-readable medium as recited in claim 18, wherein identifying at least one of a hosted virtual machine instance or physical computing device to associate to the connection request based on stored configuration information corresponding to the peripheral device includes identifying a single physical computing to associate to the connection request.

21. The non-transitory computer-readable medium as recited in claim 18, wherein obtaining a connection request corresponding to a peripheral device configured to exchange peripheral communications via the communication network includes obtaining multiple, independent connection requests from two or more peripheral devices configured to independently exchange peripheral communications via the communication network.

22. The non-transitory computer-readable medium as recited in claim 21, wherein identifying at least one hosted virtual machine instance to associate to the connection request based on stored configuration information corresponding to the peripheral device includes identifying an individual hosted virtual machine instance or physical computing device to associated with the multiple, independent connection requests.

* * * * *